Figure 3:
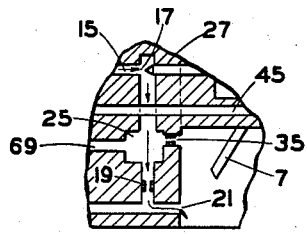

Dec. 8, 1953     R. H. THORNER     2,661,728
ENGINE GOVERNOR

Filed March 11, 1948     3 Sheets-Sheet 1

INVENTOR.
Robert H. Thorner
BY
Andrew K. Foulds
his ATTORNEY

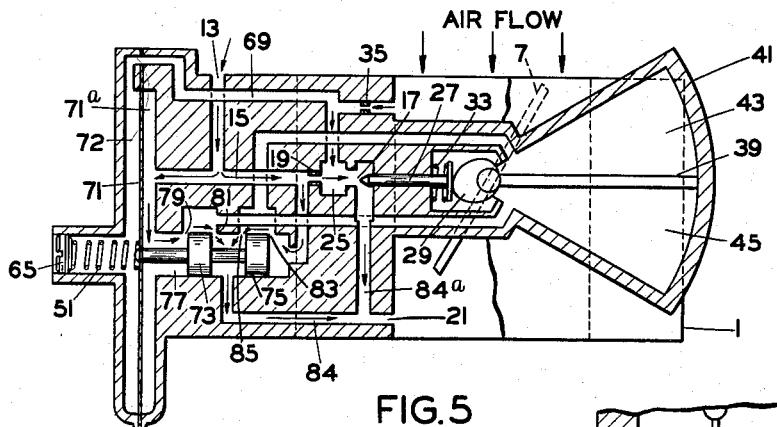
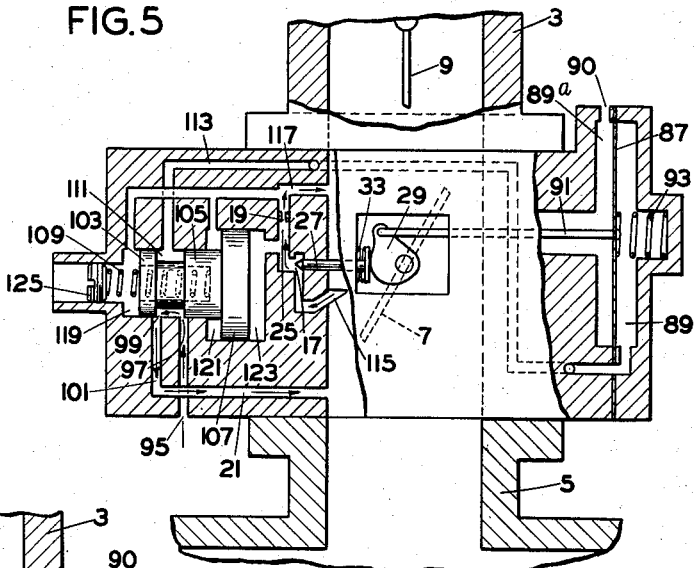
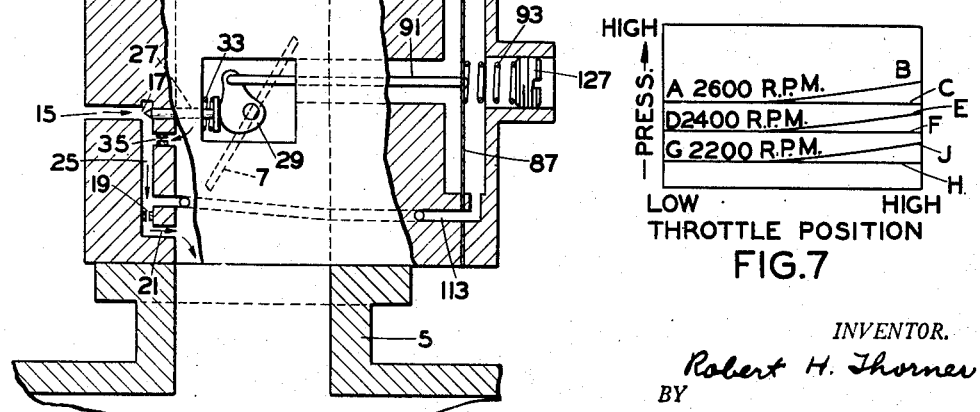

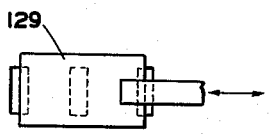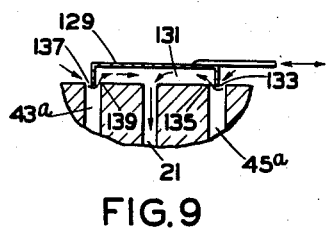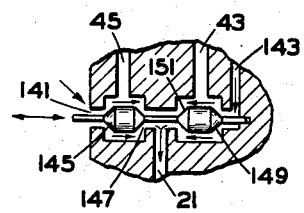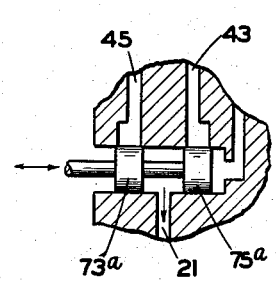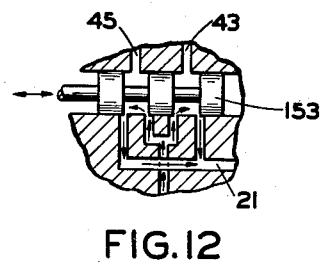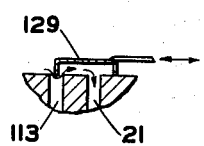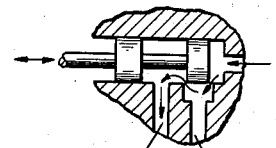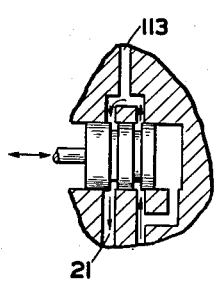

UNITED STATES PATENT OFFICE 2,661,728

ENGINE GOVERNOR

Robert H. Thorner, Detroit, Mich.

Application March 11, 1948, Serial No. 14,282

34 Claims. (Cl. 123—103)

The present invention relates to governors for internal combustion engines, and more particularly to engine controlling governors operated by fluid pressure.

Present vacuum and velocity governors are of low cost because a separate engine drive is not required. Also the installation may be made simply by placing the governor between the carburetor and the intake manifold, or they may be so installed as to operate the carburetor throttle directly. However, they inherently cause a power loss when the engine is being governed, and they cause the engine speed to vary considerably when the load is varied from no-load to full-load at the governed speed. I have found that, for proper operation of a vacuum governor, a servo-mechanism is required to operate the throttle in proper response to the small forces that arise from a small change in speed at fixed positions of the engine throttle. This change in force is known as the "sensing force" and may be as low as 0.4 inch of water per 100 R. P. M.

Governors that utilize engine-driven elements presently control the speed more closely than vacuum and velocity governors with considerably less power loss. However, this type of governor is more costly because a special engine speed-driven element is required which must be connected to the governor throttle by suitable means.

One of the objects of the present invention is to provide an improved automatic control device or governor for controlling a variable factor, such for instance as a performance factor or characteristic of an internal combustion engine, such for example as speed, torque, power, air-flow, pressure, and the like.

Another object of the present invention is to provide an improved governor for internal combustion engine, in which there are produced, in operation of the governor, forces varying substantially in proportion to the speed of the engine, which forces are made to actuate the governor throttle or other engine-controlling member accordingly.

Still another object of the present invention is to provide an improved governor of the foregoing nature, in which the governor throttle controlling forces are produced without the aid of rotating parts or elements positively driven by the engine, and which, therefore, can be installed in an engine in a simple and easy manner.

A further object of the present invention is to provide an improved governor for internal combustion engine, which, while being operable by forces produced as a result of the flow of air in the intake passage of the engine, eliminates objectionable variations from the preselected or "governed" engine speed and maintains such speed more uniform than it has been heretofore considered possible with the use of the governors of this general nature.

A still further object of the present invention is to provide an improved governor for internal combustion engine, which governor does not decrease the maximum power that can be developed by the engine in the operation range of speeds below the preselected or governed speed.

A still further object of the present invention is to provide an improved governor for internal combustion engine which governor responds to changes in conditions of engine operation without appreciable time lag; it is well appreciated in the art that such time lag is greatly objectionable as causing instability, surging and excessive "overrun" of the engine above the governed speed following acceleration, which overrun produces, in turn, undesirable "kick" or "lurch" on the vehicle operator.

A still further object of the present invention is to provide an improved governor for internal combustion engine, having a throttle or a similar engine-controlling member, in which governor there is produced due to the pumping action of the engine a zone of decreased pressure (i. e. partial vacuum) varying substantially in proportion to the speed of the engine at "fixed throttle" positions and which is utilized for the purpose of controlling position of the governor throttle, means being provided to compensate for the variations in the above mentioned decreased pressure (or vacuum) by the changes in positions of the throttle.

A still further object of the present invention is to provide an improved governor for internal combustion engine, having a governor throttle of the balanced type, improved means being provided to actuate said throttle, which means are of the pressure-responsive type and expose to the action of pressure sufficiently large areas in order to produce ample forces and thus to insure proper operation of the governor mechanisms.

A still further object of the present invention is to provide improved pressure-responsive means for actuating the throttle of an engine governor, which means are exposed on both sides thereof to the action of modified manifold vacuum, the effect of such modified manifold vacuum on the respective sides of said means being controlled by the manifold vacuum to produce the desired difference of pressures on said means, and thus to cause movement of said means for actuating the governor throttle.

A still further object of the present invention is to provide an improved governor for internal combustion engine, said governor having a throttle and a pressure-responsive diaphragm for actuating said throttle, said diaphragm being subjected at least on one side thereof to pressure dependent on manifold vacuum, the effect of said pressure being amplified by the operation of valve means responsive at fixed throttle positions to said vacuum to produce a more pronounced action on the diaphragm.

A still further object of the present invention is to provide a governor specified in the preceding paragraph, the effect of said valve means being controlled proportionally by positions of said valve means.

My engine governor utilizes as an operating function the variation of pressures in the intake passage which are incident to the flow of air to the engine, such as manifold vacuum, Venturi vacuum, or the impact pressure of the air-flow. A most important object of this invention is to provide improved means in such a governor to compensate for the variation of any of these pressures as the engine load changes, whereby the engine speed can be maintained substantially constant with negligible power loss.

Another object of the present invention is to provide an improved fluid pressure regulator device having a main fluid circuit including pressure regulating valve means for controlling pressure therein, and a power fluid circuit including pilot valve means actuated by a pressure member responsive to the controlled pressure in the main fluid circuit, and a servo-motor controlled by the pilot valve for actuating the regulating valve means.

Another object is to provide a governor having novel controlling means for regulating or controlling the operating pressures which actuate the governor throttle valve.

Still another object of the present invention is to provide means for adjusting the governor for governing the engine at selectively different engine speeds.

Figure 1:
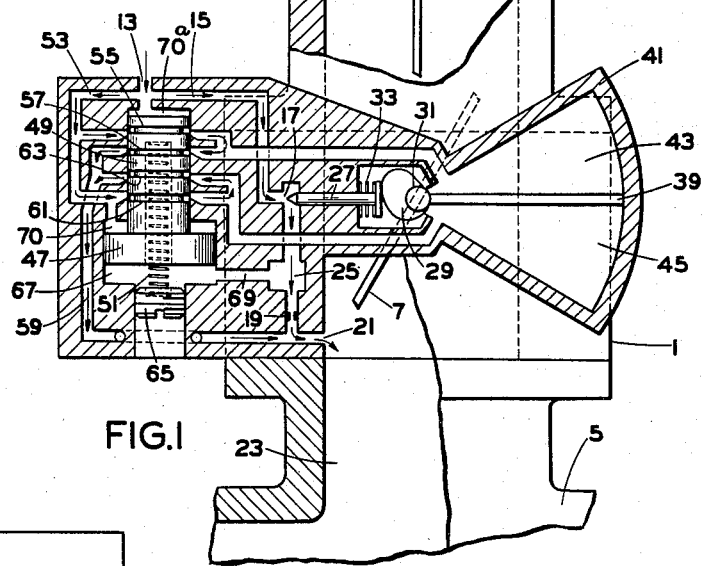
Figure 2:
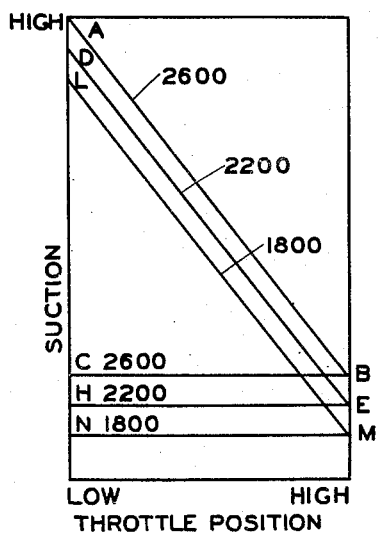
Figure 4:
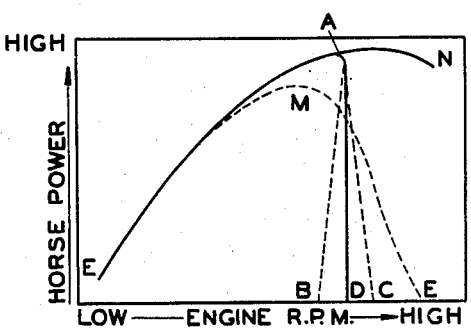

These and other objects which will appear more clearly as the specification proceeds are accomplished, according to the present invention, by the arrangement and combination of elements set forth in the following detailed description, defined in the appended claims and illustratively exemplified in the accompanying drawings, in which:

Figure 1 is a schematic view, partly in elevation and partly in section, showing one form of my governor operatively related to a carburetor and engine manifold or intake, Fig. 2 is a chart showing how the forces incident to the flow of air to the engine such as manifold suction, for example, can be corrected to provide a constant pressure at all throttle positions at constant engine speed, and a different constant-pressure for each different constant engine speed, Fig. 3 is a detail sectional view of a portion of Fig. 1, but showing compensating means for obtaining constant engine R. P. M. at varied throttle positions at each selected governed speed, Fig. 4 is a chart showing the characteristic performance of conventional governors and the improved performance of the governor of the present invention, Fig. 5 is a diagrammatic illustration of another form of my governor adapted to be intercalated between the carburetor and the manifold, as in Fig. 1, and using manifold suction to obtain the desired constant pressure at constant R. P. M. at all loads, Fig. 6 is a diagrammatic representation of still another form of my governor in which the constant pressure at constant engine R. P. M. at varied throttle positions is obtained by using the impact pressure of the air, Fig. 7 is a chart showing how the forces incident to the flow of air to the engine such as impact pressure, for example, can be corrected to provide a constant pressure at all throttle positions at constant engine speed, and a different constant pressure for each different constant engine speed, Fig. 8 shows another form of my governor which is of a simplified construction utilizing as motive pressure the control pressure utilized in the governors in Figs. 1 and 5, Figs. 9–15 show different forms of the valving means that may be used in the various forms of my invention shown in Figs. 1, 5, and 6.

The governor mechanism illustrative of the present invention is shown as a "sandwich" type governor in this disclosure but may be combined with the carburetor if desired to operate the carburetor throttle. The important fundamental principle of this governor depends on the fact that the manifold vacuum may be varied by means of two factors and hence is comprised of two components as follows:

1. The manifold vacuum may be varied by changing the throttle position at constant R. P. M.; hence the manifold vacuum is responsive to changes in throttle position, the vacuum increasing as the throttle opening decreases. This component may be referred to as "throttle vacuum."

2. The manifold vacuum may be varied by changing the engine R. P. M. at any fixed-throttle position; hence the manifold vacuum is also responsive to changes in engine speed, the vacuum increasing as the engine speed increases. This component may be referred to as "speed vacuum."

In the present invention, means are provided to eliminate or compensate for the undesirable variation of manifold vacuum with throttle position (throttle vacuum), and to utilize the vacuum that varies consistently with engine speed at any fixed-throttle position (speed vacuum).

The governor of the present invention may be divided for convenience into two elements. One element is what I prefer to call the "brain-circuit" which, according to the present invention, is incorporated to obtain a control pressure or differential of control pressures that is constant at all throttle positions at a constant engine speed but varies consistently as the engine speed varies at any fixed throttle position. This pressure might well be termed, "brain-pressure," or, "brain-suction," and is obtained by modifying any air-flow pressure variation such as manifold suction, Venturi-suction, or the impact of the air, all of which vary with engine-speed at fixed-throttle, so that a pressure is available for use in the governor which is substantially constant at constant engine speed at all loads, and yet changes consistently when the engine speed is changed. The second element consists of the mechanism provided for actuating the governor throttle positively in accordance with changes in the "brain-pressure," and for convenience herein is termed, "power-mechanism." The "brain-pressure" is used to control the "power-mechanism" either directly or indirectly as will be explained.

It should be understood that regardless of whether the term, "suction" is used instead of "pressure," it is to be interpreted as the difference between two absolute pressures, and accordingly refers to the same physical state as when the term "pressure" is used. A thorough discussion of suction and absolute pressure is set forth in my book, "Aircraft Carburetion," pages 6–27, published in 1946 by John Wiley & Sons, New York.

It should be understood that several modifications may be incorporated to provide the desired "brain-circuit" according to the present invention; hence the "brain-circuits" shown in the accompanying figures are meant to be exemplary. Likewise, several forms of the "power mechanism" may be combined with the "brain-circuit" to produce the present invention so that the "power mechanisms" shown in the accompanying figures are merely illustrative.

Briefly the brain circuit comprises a conduit that directs air from a high pressure area, to a lower pressure area preferably to the air intake passage of the engine, and two or more restrictions are located in this conduit. One of the two openings of the conduit is exposed to one of the forces incident to the air flowing to the engine such as manifold-suction, Venturi-suction, or the air impact pressure. All of these forces vary with the speed of the engine at any fixed throttle position and so can be used as an indicator of speed. However, the effect of "throttle vacuum" must be cancelled by suitable means so that a constant pressure or force is provided at all throttle positions at each constant engine speed. Obviously the "throttle vacuum" may be best compensated for by means directly operable by the throttle. This is done in the preferred form by varying the opening of one of the restrictions preferably in accordance with the opening of the governor throttle to provide substantially constant pressure in the conduit between the variable restriction and one of the other restrictions in series with the variable restriction at all throttle positions at substantially constant engine speed. Then the "brain-pressure" will be substantially constant at all throttle positions at constant engine R. P. M. and will be a consistently different constant-pressure at a different engine R. P. M. According to the present invention, it makes no difference whether the brain circuit utilizes the Venturi suction, the impact pressure, or the manifold suction, although the latter force is preferred and is shown by way of illustration in Figs. 1, 5, and 8. When referring to an orifice in this description, it should be understood that regardless of whether the word "jet," or "orifice," or "restriction" is used, reference is had to a controlled restriction in a fluid flow circuit for the purpose of providing a controlled change in pressure in the fluid flow circuit.

The "brain-circuit" as above noted, preferably has two restrictions in series but also might have two or more inlet restrictions in series with one or more restrictions on the outlet side of the circuit; thus, my invention is unchanged if more than one restriction is in series and/or parallel. It makes no difference whether the variable restriction is located on the inlet or discharge side of the other restriction as long as the variable restriction opens to maintain the desired suction in the conduit between the two restrictions. Also, one end of the "brain-circuit" may be connected to the intake passage on the engine-side of the throttle valve according to the preferred arrangement of the present invention. Also, the fixed restriction may be adjustable. In another form of this invention, see Fig. 6, the "brain-circuit" comprises a conduit which is connected between an impact tube on one end and a static port on the other end, both of which are located on the up-stream side of the throttle valve, and two or more restrictions are located in the said circuit, one of which varies in accordance with the movement of the throttle valve to correct for "throttle vacuum" and to maintain substantially constant pressure in the conduit between the two restrictions. In still another form of my invention, the conduit that includes the two restrictions comprising the "brain-circuit" may be connected between the throat of the carburetor venturi on one end and a point of higher pressure on the other end, one of the restrictions being variable in accordance with the movement of the governor throttle.

The "power mechanism" comprises a displaceable member which is suitably connected to actuate the governor throttle valve. The displaceable member divides its housing into two separate chambers, and the pressure in one or both of these chambers is controlled in the preferred form by valving means which is moved by a movable member operable by the "brain-pressure." In one modification of my invention, see Fig. 8, the valving means is omitted and the "brain-pressure" is conected directly to one of the chambers formed by the displaceable member which moves in opposition to an adjustable spring.

This displaceable member of the power mechanism for operating the throttle valve forms two chambers and may be of any suitable type such as a diaphragm, piston, or swingable vane type, the latter being shown by way of illustration in Figs. 1 and 5. In this arrangement, the pressure in both chambers formed by the displaceable member is regulated by the aforementioned valving means. However, in another form of my invention, the pressure in only one of these chambers is controlled by the valving means, and resilient means is used to oppose this pressure. The valving means for controlling the pressures in the chambers formed by the displaceable member in its housing can be of several types. As shown in Fig. 1, a piston-valve 49 having four ports is used. However, a different arrangement is shown in Fig. 5 in which two flanges form four restrictions in a manner that will be explained. Fig. 14 shows the same type as shown in Fig. 5 in which only two restrictions are used. Another form of valving means is a slide-valve design as shown in Figs. 9 and 13. Still another piston-type of valving means is shown in Figs. 6 and 12 which forms two or four restrictions, respectively. Figure 10 shows a poppet-type of valving means which is a preferred form. The movable member for moving the valving means may be of any suitable type such as a diaphragm or piston.

Referring now to the figures, the basic principle of the present invention is an application of the bleed-principle of pressure-control which is described in detail on pages 34 and 35 of my said book, "Aircraft Carburetion."

Referring specifically now to Fig. 1, a governor housing 1 is shown as a "sandwich-type" positioned between and sealed to the downdraft carburetor 3 and the intake manifold 5 of what may be considered as a conventional type of internal combustion engine, the manifold 5 being employed to direct the charge from the carburetor 3 to the various cylinders of the engine. In Fig. 1 by way of illustration, a downdraft carburetor is shown. However, the governor may be used with either an updraft or downdraft carburetor. The "sandwich" governor includes a separate governor throttle 7 in addition to the conventional carburetor throttle 9 which is located on the downstream side of the carburetor venturi 11 as shown. The governor throttle 7 controls the engine only when the carburetor throttle 9 is opened sufficiently to allow the engine to exceed the governed R. P. M.

In Fig. 1, the air entering the carburetor flows downward through the venturi as shown by the arrow. Fuel is admitted to the air at the Venturi throat before the air reaches the throttle 9. The mixture then flows downward past the throttles 9 and 7 and into the intake manifold 5 where the mixture is distributed to the various cylinders, all in a manner well known to those skilled in the art.

The "brain-circuit" shown in Fig. 1 includes the atmospheric inlet 13, the conduit 15, the variable restriction 17, the chamber 25, the restriction 19 and the outlet 21. A very slight amount of air is caused to circulate through this circuit as a result of the low pressure existing at 23 on the downstream side of the governor throttle 7 in the intake manifold 5. Another common name for this low pressure as previously discussed is, "manifold-suction." The pressure in the section or chamber 25 of the conduit which is between the two restrictions is the "brain-pressure" and is regulated by the amount of opening or effective flow area of the variable restriction 17 relative to the effective flow area of the restriction 19. This opening is varied in accordance with the throttle position by means of any suitable mechanism, one form of which is shown in Fig. 1. The mechanism shown in Fig. 1 consists of a spring-loaded needle valve 27 which is operated by a cam 29 secured to the throttle shaft 31.

In disclosing the principle of operation of my governor, the discussion first will describe how the brain mechanism is constructed and worked out in the laboratory, for example, using a piece of test equipment commonly known as a dynamometer. Then the power unit will be explained in relation to the "brain-unit," and finally the construction evolved in this manner will be described in terms of actual operation as a governor on a vehicle operating on the road.

When working out this governor on the dynamometer, the governor throttle is locked in different fixed positions at various increments of opening such as every 5 degrees, for example, from closed throttle to wide-open throttle. Hence under these conditions the governor throttle is not free to be operated automatically as in actual operation on the road.

When the governor throttle is moved toward the closed position while constant engine speed is maintained on the dynamometer, the spring 33 causes the needle valve 27 to follow the cam and increase the effective orifice opening at 17. The contour of the cam and, if desired, the contour of the needle valve is made so that the variation in the opening at 17 maintains substantially constant suction in the conduit 25 although the manifold suction increases as the throttle is closed at this constant engine speed which, of course, would correspond to the R. P. M. at which it is desired to govern the engine in actual operation. Hence, the combination of the needle valve 27, the restriction 19, and cam 29 compensates for "throttle vacuum."

The constant pressure produced in chamber 25 at constant engine speed at different loads or throttle positions is shown in the chart of Fig. 2. This chart shows the variation of manifold suction as well as the suctions in chamber 25 at several constant-engine speeds as the load is varied from no-load to full-load. For example, if the engine is to be governed at 2600 R. P. M., the contour of the cam 29 and, if desired, the contour of the needle valve 27 of Fig. 1 is worked out to provide constant suction in chamber 25 at 2600 R. P. M. at all throttle positions. The cam and needle contour can be worked out on a dynamometer in this manner. In Fig. 2, the line B—C represents the constant suction in chamber 25 at 2600 R. P. M. corrected for "throttle-vacuum" at all throttle positions, whereas the line A—B represents the variation of the manifold suction on the engine side of the governor throttle 7 in the intake manifold 5 at 2600 R. P. M. at all throttle positions.

If the governed speed of the engine is reduced by adjustment of spring 51, see Fig. 1, below 2600 R. P. M. to 2200 R. P. M., for example, the manifold suction at each throttle position is less, so that the suction in chamber 25 is correspondingly less. The manifold suction at 2200 R. P. M. would be represented by the line D—E in Fig. 2, and the suction in chamber 25 at 2200 R. P. M. would be represented by the line E—H, in Fig. 2, which should be parallel to the horizontal constant-suction line B—C at 2600 R. P. M. Likewise, the lines L—M and M—N represent the manifold suction in the intake manifold and the "brain-suction" in chamber 25, respectively, at 1800 R. P. M. The curves B—C, E—H, and M—N are functions of the "speed-vacuum" components of the manifold vacuum since their value varies with engine speed. The reason it is desired to work out the cam and needle contour so that the line M—N is substantially parallel and horizontal to the lines B—C and E—H with the corresponding R. P. M. held constant is so that a different constant absolute pressure (or suction) is available at each governed engine speed regardless of throttle position; then in actual operation as a governor, if the "brain-suction" is held constant at each setting of the speed adjusting screw 65, Fig. 1, the engine R. P. M. will be constant at all throttle positions, which is actually how this governor functions in practice. Hence, in this governor, suction is available that varies with the speed of the engine regardless of load and throttle position. For reasons that will become more apparent, it is desirable to have the lines E—H and M—N exactly parallel to B—C which is substantially a horizontal or constant suction curve. Since the cam is preferably worked out on the dynamometer to provide constant suction in chamber 25 at only one engine speed, it is possible that at other engine speeds with the same cam, the lines E—H and M—N when plotted might not show exactly constant suction, and hence would not be exactly parallel to the horizontal line B—C. In order to compensate for possible non-parallelism of lines M—N and E—H with the constant suction line B—C the controlling or brain circuit of Fig. 3 may be employed, as it may also be employed if the lines M—N and E—H are in fact not horizontal for the contour of cam 29 which gives a constant suction at one constant engine speed.

Referring to Fig. 3 another fixed or calibrated orifice 35 allows gasoline vapor from the upstream side of the throttle valve 7 to flow into chamber 25 where it joins the air from the atmospheric line 15 and flows through the restriction 19 and into the intake manifold through the conduit 21. By correctly working out the relative sizes of the restrictions 19, 35, and 17, it is possible to improve the curves which represent the suction in conduit 25 in Fig. 2 so they are more nearly parallel and horizontal at different engine speeds when the cam 29 is made to provide constant suction in conduit 25 at only one engine speed at all throttle positions. Thus by means of the brain circuits shown in Figs. 1 and 3, a suction is available in conduit 25 that increases substantially consistently with the engine speed regardless of load. Another way of saying this is that an absolute pressure is available in conduit 25 that reduces with engine speed regardless of load or throttle position.

The discussion thus far has been concerned with how the mechanism would be worked out using a dynamometer. Now considering how the same device functions in actual operation as a governor on the road; it will be shown presently that the governor mechanism automatically operates as a pressure regulator to maintain constant suction (or constant absolute pressure) in chamber 25 regardless of R. P. M. at each fixed setting of the speed adjusting screw 65, Fig. 1, and at each different setting of the speed adjusting screw, a different constant suction is automatically maintained in chamber 25 at all throttle positions at the governed speed. Then the consistency of R. P. M. at each setting of the speed adjusting screw at all throttle openings depends on the cam and needle contours, or the rate of opening of the variable orifice 17, Fig. 1. If the cam and needle contours are worked out on a dynamometer, for example, as previously explained, to provide constant suction at constant R. P. M. at all throttle positions, then in actual operation as a governor, the R. P. M. will be constant at all throttle openings since the "brain-suction" is automatically maintained constant as will be explained; however, this would be true at only one setting of the speed adjusting screw 65. It was shown that when working out this governor on a dynamometer, the R. P. M. would be held constant and the cam and needle contour would be worked out to give constant suction at different fixed-throttle positions; then the "brain-suction" might not be constant at other settings of the speed adjusting screw 65 at all throttle positions. With this same situation in actual operation as a governor, the "brain-suction" would automatically be held constant, whereas the variation at different settings of the speed adjusting screw 65 from the calibrated setting would manifest itself as a slight change in engine R. P. M. as the load is varied from no-load to full-load. In order to maintain constant R. P. M. at other settings of the speed adjusting screw, the "brain-circuit" shown in Fig. 3 may be employed in the manner previously described.

The governor throttle 7 is actuated by a motor which includes a displaceable member that may be of any suitable type such as a diaphragm, piston or swinging vane type, the latter being shown by way of illustration. Accordingly a power-operated swingable vane 39 is secured to the throttle shaft 31 and is enclosed by and sealed in relation to the walls of a casing 41 to form two variable chambers 43 and 45. The intake manifold suction is used as a source of power to operate the vane 39. The piston 47 is actuated by the brain-pressure in chamber 25 and operates the piston valve 49 which contains four port-type restrictions that are used to control the suctions in chambers 43 and 45 in the following manner.

The basic principle of the power device is that fluid is circulated through each of the two chambers 43 and 45 or extensions thereof, which are formed by the vane 39. In this respect it will be appreciated that it makes no difference whether such circulation occurs directly in the chambers 43 and 45, or in some passage or chamber in open communication therewith, the pressures in these chambers varying by the same amount in either case. In the cases shown, no circulation actually occurs in the chambers 43 and 45, or their equivalents, but rather in passages or chambers to which they are open. Each of the chambers has inlet and outlet restrictions in the circuit therethrough. The resistance of one or more of the restrictions is caused to vary by a change in the "brain-pressure" so that the pressure in one chamber changes with respect to the pressure in the other chamber and the vane moves the throttle 7 until the original value of the "brain-pressure" is restored. Since each value of the brain-pressure (or "brain-suction") corresponds to a definite engine speed as previously explained, the governor mechanism maintains constant the engine speed corresponding to the "brain-pressure" for which the spring 51 is adjusted as will be explained. If preferred the "brain-vacuum" may be made constant at all engine speeds by using only one spring force if a different cam contour is used at each different engine speed.

Referring to Fig. 1, the manifold suction causes air to circulate through each of the fluid-bleed circuits in the chambers formed by the vane 39, or extensions thereof. In the fluid-bleed circuit for circulating fluid through an extension of chamber 43, atmospheric air is caused to flow through inlet 13 and conduit 53, through the inlet variable restriction 55, through the extension of chamber 43, through the outlet variable restriction 57, through the manifold suction conduit 59, and to the intake manifold through the outlet 21. In the fluid-bleed circuit for circulating fluid through an extension of chamber 45, atmospheric air is caused to flow through inlet 13 and conduit 53, through the inlet variable restriction 61, through the extension of chamber 45, through the outlet variable restriction 63, through the manifold suction conduit 59, and to the intake-manifold through the outlet 21. The amount of air that flows through these two air bleed-circuits is very small since it is used merely for pressure control as explained in my book, "Aircraft Carburetion," on pages 34 and 35. This small amount of air is not sufficient to upset the idling characteristics of the engine.

Thus, the four peripheral grooves or variable restrictions of the piston-valve 49 serve as four variable orifices or ports associated with the two fluid-bleed circuits directed through the chambers formed by the vane 39. The piston-valve is urged upward by the force of the spring 51 as determined by the manual adjustment of its screw-threaded stop or abutment 65, the spring preferably extending upward into and abutting the base of an axial recess in the piston-valve. The "brain-suction" in chamber 25 is transferred to chamber 67 through the conduit 69 so that the spring force is opposed by this suction which, as has been explained, varies with the speed of the engine regardless of load, there being atmospheric pressure on the opposite side of piston 47, that is in the chambers 70 and 70ᵃ which are in communication with air inlet 13. The spring 51 can be adjusted to balance a definite value of "brain suction" that corresponds to the desired governed engine R. P. M. If the engine R. P. M. exceeds this value, the "brain suction" increases in chamber 67 and causes the piston-valve 49 to move downward, and when the engine R. P. M. falls below this value, the "brain suction" decreases in chamber 67 and allows the spring 51 to move the piston-valve upward.

When the piston-valve moves downward because of an increase in the "brain suction" in chamber 67, the opening of the restriction 55 gradually increases and the opening of the restriction 51 gradually decreases; the effect of this action on the air bleed circuit through chamber 43 is to reduce the amount of manifold suction that is transferred into chamber 43 so that the absolute pressure in chamber 43 gradually increases when the piston-valve moves downward. Also when the piston-valve moves downward, the opening of the restriction 63 gradually increases, and the opening of the restriction 61 gradually decreases; the effect of this action on the air-bleed through chamber 45 is that it increases the amount of the manifold suction which is transferred into chamber 45 so that the absolute pressure in chamber 45 gradually decreases. Hence when the piston-valve moves downward, the pressure differential existing across the vane 39 increases to cause the governor throttle 7 to be moved by the vane toward the closed position.

When the piston-valve 49 is moved upward by the spring 51 because of a decrease in the "brain-suction" in chamber 67, the operation of the combined action of the four variable restrictions is reversed whereby the pressure differential existing across the vane 39 increases to cause the governor throttle 7 to be moved by the vane toward the open position.

Now consider the operation of the governor when the brain-circuit principle and the power mechanism, an example of which has been described, are combined to form the present invention. Briefly the overall governor operation is this: a suction (or pressure) which varies consistently with the engine-speed, controls a fluid servo-mechanism that operates the governor throttle so that when the engine speed increases above the governed value, the governor throttle is closed sufficiently to cause the engine speed to reduce to its original value; and when the engine speed decreases below the governed value, the governor throttle is opened sufficiently to cause the engine R. P. M. to increase and return to the original governed speed regardless of load.

In Fig. 1, as previously explained, the "brain-suction" in chamber 25 increases consistently with engine speed which tends to pull the piston-valve 49 downward in opposition to the force of the spring 51. It has been explained that when the piston-valve moves downward the governor throttle is moved toward the closed position, and when the piston-valve moves upward, the governor throttle is moved toward the open position. The total travel of the piston-valve is very slight so that the governor throttle responds instantaneously to the slightest variation in the "brain-suction." The spring force may be adjusted to balance exactly the suction corresponding to the desired governed speed. When the engine speed tends to exceed the governed R. P. M. due to a decrease in load, the suction in chamber 67 increases and causes the piston-valve 49 to move downward, thereby causing the vane 39 to reduce the throttle opening sufficiently to return the engine speed to the governed value. Conversely, when the engine speed tends to fall below the governed R. P. M. due to an increase in load, the suction in chamber 67 decreases which allows the spring 51 to move the piston-valve upward thereby causing the vane 39 to increase the throttle opening sufficiently to return the engine speed to the governed value.

Consider the operation of the governor when the engine is accelerated to the governed speed by using the carburetor throttle. When the engine is first started, the "brain-suction" in chamber 67 is not sufficient to overcome the force of the spring 51 so that the piston-valve is held in the upward position causing the governor throttle valve 7 to be open. As the engine speed increases, the "brain-suction" in chamber 67 increases; when the engine reaches and tends to exceed the governed speed, the suction in chamber 67 overcomes the force of the spring 51 thereby causing the piston-valve 49 to move downward; this action affects the two fluid-bleed circuits to change the pressure differential across the vane so that the vane reduces the throttle opening sufficiently to return the engine speed to its governed value. Because the piston-valve has a relatively short travel which can produce rapid and full travel of the governor throttle, the throttle remains wide open until the governed R. P. M. is attained; hence there is no loss of power with my governor.

When the piston valve comes to rest, all four of the restrictions are about one-half open, so that air continuously bleeds through the two fluid-bleed circuits in the chambers formed by the vane 39 when the governor is "on speed," or stabilized. At this time the absolute pressure in chamber 43 is then about equal to the absolute pressure in chamber 45. As a result of the air-bleed circuits, the slightest movement of the piston-valve in either direction instantaneously changes the pressures in each chamber in the opposite direction.

Now consider how the entire governor mechanism in actual operation acts as a pressure regulator to maintain constant "brain suction" in chamber 67 under all conditions of speed or load when the engine is being governed. The spring 51 is of low rate so that it urges the piston 47 and the piston-valve 49 upwards with a force which is substantially constant considering the very short travel of the piston 47. Hence the piston 47 and the piston-valve 49 will stop moving only when the suction in chamber 67 is sufficient to balance the force of the spring 51. If the suction is too high, the piston moves downward and if too low, the piston moves upward. The piston only stops moving when the suction balances the force of the spring. The regulator action occurs, for example, when a vehicle being controlled by this governor ascends a hill; the effect of the added load due to the hill tends to decrease the engine R. P. M. which, in turn, tends to decrease the manifold suction, as well as the "brain-suction" for an instant in chamber 67. When the "brain-suction" decreases, the piston 47 and piston-valve 49 are moved upward by the force of the spring 51. As previously explained, the movement of the piston-valve upward causes the absolute pressure in chamber 45 to increase and the pressure in chamber 43 to decrease; this pressure change causes the vane 39 to move upward which reduces the opening of the variable orifice 17, thereby increasing the suction in chamber 25. The vane continues to move upward until the suction in chamber 25 and 67 is returned to its original value to balance the spring 51. The piston-valve then automatically assumes a fixed position that regulates the pressures in chambers 43 and 45 so that the vane is stationary. Incident to the pressure-regulating action, the movement of the vane 39 upward to its new stabilized position carries the throttle to a wider opening, thereby increasing the governed speed. If the contour of cam 29 is correct, the original level-road governed speed will be restored. However, if the rise of cam 29 were too steep, the vane 39 (and throttle 7) would be moved through a smaller arc of angular travel in order to decrease the opening of orifice 17 sufficiently to restore the original value of "brain-pressure"; then the R. P. M. would be less than the original level-road R. P. M., so that the governor would lose speed under load. If the rise of cam 29 were too shallow, the vane 39 (and throttle 7) would be moved through a greater arc of angular travel in order to decrease the opening of orifice 17 sufficiently to restore the original value of "brain-pressure"; then the new settled R. P. M. would be greater than the original level-road R. P. M., so that the governor would gain speed under load. Thus it is apparent that with the correct cam and needle contours, constant R. P. M. can be maintained as the vehicle climbs a hill.

Conversely, if the vehicle descends a slight grade, the engine R. P. M. tends to increase, thereby increasing the manifold suction as well as the "brain suction" in chamber 25 for an instant. As explained, the pressure regulator action causes the vane to move downward to increase the opening of the variable orifice 17; this movement continues until the original "brain suction" is restored and the piston-valve 49 then stops moving. The movement of the vane 39 carries the thottle to a new and lesser opening so that the R. P. M. is prevented from increasing; the final R. P. M. as explained depends on having the correct cam and needle contours, or more specifically, the relation of the rate of opening of orifice 17 to throttle movement. The regulating action of my governor described in the detailed discussion presented here occurs instantaneously in actual operation. Thus regardless of any other factors, the governor of the present invention will always automatically adjust itself to maintain a constant pressure in chamber 25 as determined by the force of spring 51. The positioning of the throttle 7 is merely a "by-product" of this pressure regulating action. The functioning of similar pressure regulators is described in pages 108–113 and 130–135 of my book, "Aircraft Carburetion."

From the foregoing discussion it is apparent that the governed speed of my governor may be made selectable in at least two ways. The spring 51 may be adjusted to give different governed speeds if only one cam contour is used for all speeds, whereby different "brain vacuums" correspond to different engine speeds. With the second method, one spring setting may be used whereas a different cam contour is used at correspondingly different engine speeds so only one "brain-vacuum" is obtained at all engine speeds and each cam contour thereby provides only one engine speed at all loads.

Fig. 4 is a chart showing the desired performance of an engine-speed governor as well as the performance of present-day governors. The chart shows the relation between horsepower on the vertical scale and engine R. P. M. on the horizontal scale. The wire-open-throttle power curve of an internal combustion engine is shown by the line E—A—N. The line A—D represents the desired control of the engine by a governor; since this line is vertical, the engine speed would be constant at all loads while the engine is being governed so that the operation would be isochronous. Isochronous governing is desired in engines for alternating-current electric generators and also in automotive operation. In engines for use with direct current electric generators, sometimes the engine speed should decrease as the load is decreased as shown by the line A—B in Fig. 4, whereas at other times isochronous operation is desired.

Present-day vacuum and velocity governors prevent the use of wide-open-throttle power at the governed speed and they also cause the engine speed to vary considerably as the load is varied between full-load and no-load; a typical curve for a conventional vacuum governor is shown by the line M—E, Fig. 4, in which the engine speed will vary 500 R. P. M. or more when the engine is being governed. Present-day governors having engine-driven elements such as a flyball governor will not produce so much power loss, but will still cause an undesirable variation in the engine speed between full-load and no-load of as much as 200 R. P. M. at the governed engine speed as shown by the line A—C. However this type of governor is much more expensive than vacuum or velocity governors because of the separate engine-speed drive and is difficult to install in the field as a replacement governor.

The governor of the present invention may be made as simple and at a cost as low as conventional velocity and vacuum governors and yet will produce no power loss because the governor throttle is wide open until the governed speed is attained. Also, by developing the contour of cam 29 as required, the governor may be made to produce any load curve such as A—B, A—D, or A—C in Fig. 4. Hence the governor may be made isochronous if desired.

Referring to Fig. 2, the slope of the governor curve can be controlled by working out the cam 29 (Fig. 1) in the following manner on a dynamometer as previously explained: If the cam is made so that the constant-speed curves B—C, E—H, M—N, etc. (Fig. 2), are horizontal and parallel while the respective engine speeds are held constant, the governor will be isochronous at all speeds in actual operation and will produce the curve, A—D, in Fig. 4 at each governed speed. If the cam is made so that the constant-speed curves B—C, E—H, M—N, etc. (Fig. 2), slope downward to the left while the respective engine speeds are held constant, the governor will produce a curve similar to A—C of Fig. 4 at each governed speed in actual operation, so that the engine speed will increase slightly as the load is reduced at the governed engine speed. If the cam is made so that the constant-speed curves B—C, E—H, M—N, etc. (Fig. 2) slope downward to the right while the corresponding engine speeds are held constant on the dynamometer, the governor will produce a curve similar to A—B of Fig. 4 at each governed speed in actual operation, so that the engine speed will decrease slightly as the load is reduced at the governed engine speed.

Fig. 5 shows that the same governor described in connection with Fig. 1 can have numerous variations in construction and arrangement without departing in any way from the scope of the invention. Referring to Fig. 5 a diaphragm 71 is used for the movable member instead of the piston 47 in Fig. 1 and separates two chambers 71ª and 72 such that the diaphragm is moved by the difference of the pressures therein. The "brain-pressure" is transferred to chamber 72 from chamber 25 through conduit 69. The other side of the diaphragm which forms a wall of chamber 71ª is exposed to the atmosphere through conduit 13. Also the four variable restrictions in Fig. 5 are formed by two cylindrical flanges or slide valves, 73 and 75, which are operated by the diaphragm 71 to slide in the cylinder 77. The width of the flanges 73 and 75 is less than the width of the respective openings which they control and which communicate through independent passageways with the chambers 45 and 43 respectively. The inlet and outlet variable orifices for chamber 45 are 79 and 81 respectively, and the inlet and outlet variable orifices for chamber 43 are 83 and 85, respectively. The variable restrictions, 79 and 81, and 83 and 85, are formed by the edges of the flanges 73 and 75 in combination or cooperation, respectively, with the openings of the passages extending from chambers 45 and 43 into the annular chamber 77. The chamber between the two flanges is exposed through the conduit 84 to the manifold suction, so that atmospheric air bleeds through the conduit 13, and through the two chambers 43 and 45, and out the conduit 84 to the outlet 21 into the manifold as shown by the arrows. Another change shown in Fig. 5 is that the restriction 19 is located on the atmospheric end of the "brain-circuit," and the variable orifice 17 is located on the suction end of the circuit, that is, at the outlet of chamber 25. With this arrangement, the identical results will be produced as are accomplished by the structure of Fig. 1, provided only that the cam 29 tends to close the orifice 17, as shown, when the governor throttle moves toward the closed position. The operation of the governor shown in Fig. 5 is substantially the same as that shown in Fig. 1 and will be readily understood from the foregoing and the following description.

The governor shown in Fig. 5 has the "brain circuit" shown in Fig. 3 incorporated therein. Referring to Fig. 5, gasoline vapor flows through the restriction 35 into chamber 25 to join the air that enters through the restriction 19 and flows from the chamber 25 through the variable restriction 17 and conduit 84ª to the outlet 21 into the manifold on the downstream side of the governor throttle 7. The purpose and principle of this form of the "brain circuit" is the same as for the "brain circuit" shown in Fig. 3 which is to provide constant R. P. M. at each setting of the speed adjustment screw 65, Fig. 1.

Fig 6 shows another form of the power mechanism and a different "brain circuit" of my governor without departing in any way from the scope of the invention. In the designs shown in Figs. 1 and 5 each of the two chambers formed by the vane 39 have inlet and outlet restrictions; these restrictions can be varied by the "brain-pressure" to cause the pressure in one chamber to rise while the pressure in the other chamber reduces so that the pressure differential across the vane causes the vane to move the governor throttle to restore the original value of the "brain-pressure" by means of the movement of the needle 27. As shown in Fig. 6, a diaphragm 87 may be used for the displaceable member instead of a vane or piston if desired. One variation shown in Fig. 6 is that only one of the chambers, 89, which is formed by the diaphragm or vane incorporates or is controlled by my novel air-bleed control mechanism. As in the chambers in Figs. 1 and 5, this chamber 89 has inlet and outlet restrictions that can be varied to cause the suction in this chamber to vary as desired. The chamber 89ª on the other side of the diaphragm 87 is exposed to the constant atmospheric pressure through the air inlet 90. Thus the suction in chamber 89 tends to move the throttle valve 7 towards the closed position by means of the linkage 91. This movement is opposed by a spring 93 which acts against the diaphragm 87. If the suction in chamber 89 is reduced, the spring 93 moves the throttle 7 towards the open position. The suction in chamber 89 is varied in exactly the same manner as in each of the two chambers formed by the vane in Figs. 1 and 5. In Fig. 6, atmospheric air enters conduit 95 and flows through the inlet restriction 97, through an extension 111 of chamber 89, through the outlet restriction 99, and through conduit 21 to the intake manifold on the downstream side of the throttle 7. The valving means in Fig. 6 which controls the pressure in chamber 89, comprises the inlet and outlet restrictions 97 and 99 which are formed by the flanges or slide valves 103 and 105 operable by the piston 107, which is the movable member in this form of the invention. The variable restrictions 99 and 97 are formed by the edges of the flanges 103 and 105 in combination or cooperation, respectively, with the openings of the passages 101 and 95 into the annular chamber 111. When the piston 107 moves to the left against the spring 109, the opening of restriction 97 is reduced by the valve 105 and the opening of restriction 99 increases because of the uncovering movement of valve 103 thereby increasing the suction in the chamber 111 between the two flanges or valves. Chamber 111 is connected to chamber 89 by means of the conduit 113, so that the two variable restrictions 97 and 99 regulate the pressure in chamber 89 in a manner previously described.

In the foregoing examples of my invention I have shown the "brain-circuit" exposed only to the manifold suction, or the absolute pressure on the downstream side of the governor throttle. In Fig. 6, I have shown how my invention is unchanged if the "brain-circuit" is connected between the impact and static pressures measured at approximately the same point in the air intake passage. Referring to Fig. 6 the "brain-circuit" comprises the impact tube 115 which is exposed to the impact pressure on the upstream side of the downstream end of the governor throttle 7 and is in series with the variable restriction 17, the conduit 25, the restriction 19, and the outlet conduit 117. The conduit 117 discharges into the mixture passageway and is exposed to the static absolute pressure on the upstream side of the throttle valve 7. Hence air or fuel mixture is caused to bleed through the impact tube 115, through the variable restriction 17, through conduit 25, through the restriction 19, and out through the conduit 117. The static pressure in conduit 117 is transferred to chambers 119 and 121 to bear on the flange 103 and the piston 107, as shown, in opposition to the "brain-pressure" in conduit 25 which is transferred to chamber 123 to bear on the other end of the piston 107.

As explained, it is desired to have the pressure in chamber 123 substantially constant at constant engine speed at different throttle positions, or conversely, it is desired to have the engine R. P. M. constant at constant "brain-suction." This desired relation is shown in Fig. 7 which is a chart showing the variation of the pressure in chamber 123 at different loads or throttle positions at various constant engine speeds. It is desired to have the curves horizontal and parallel at different constant engine speeds such as curves A—C, D—F, G—H, etc. This result can be approached closely merely by locating the impact tube on the upstream side of the governor throttle valve 7, but as close as possible to the edge of the downstream end of the throttle 7 when the throttle is closed. When the governor throttle is moved toward the closed position while the engine R. P. M. is held constant when working out this form of my invention on a dynamometer, the amount of air flowing to the engine reduces so that normally the impact pressure would reduce. However when the governor throttle-valve 7 is moved toward the closed position, the velocity of the reduced amount of air must increase in order to pass through the reduced opening at the throttle-valve so that the air velocity will be fairly constant at all throttle openings at constant engine R. P. M. If the impact tube 115 is located as shown in Fig. 6, it will be exposed to the velocity of the air passing around the throttle valve so that approximately constant pressure will be encountered in the impact tube. However, it is difficult to make the pressure in the conduit 25 exactly constant as desired. In other words, dynamometer curves might be produced that vary as curves A—B, D—E, G—J, etc., in Fig. 7. Therefore the cam 29 is worked out on the dynamometer to vary the restriction 17 to maintain constant pressure in chamber 123 at constant engine speed at all throttle positions as shown for example by the curve A—C in Fig. 7. Then a pressure is available in conduit 25 and in chamber 123 that increases consistently with the speed of the engine at all loads. As before, the spring 109 is adjustable by an adjusting screw 125 to determine when the piston 107 and the associated valving means will move to the left, thereby determining the governor cut-off R. P. M. The governing action is the same as previously described. When the engine speed increases above the governed speed, the pressure in chamber 123 increases. This increase causes the piston, which in this example is the movable member, to move to the left against the force of the spring 109 which increases the opening of the restriction 99 and decreases the opening of the restriction 97, thereby allowing more of the manifold suction to be transferred into chamber 89; this action causes the diaphragm 87 to move the throttle 7 toward the closed position against the force of the spring 93 until the original "brain-pressure," and governed engine-speed, is restored. When the engine speed reduces, the piston is moved to the right by the spring 109, which decreases the suction in chamber 89 so that the spring 93 opens the throttle 7 sufficiently to restore the original "brain-pressure" and the governed engine speed.

Fig. 8 shows a governor that incorporates a simplified power mechanism without departing from the scope of the invention in any way. The governor is shown between a downdraft carburetor 3 and the intake manifold 5. In Fig. 8, the "brain-circuit" is the same as described in connection with Fig. 3 and comprises the conduits 15, 25, and 21, containing the restrictions 17, 35, and 19, one of which is varied by the throttle movement to maintain constant suction in conduit 25 at constant engine R. P. M. at all throttle positions. This constant suction is transferred directly through conduit 113 to chamber 89 formed by the diaphragm 87. A piston or vane, of course, could be used instead of the diaphragm 87. The chamber 89a on the other side of the diaphragm is exposed to the atmosphere through the air inlet 90. The suction in chamber 89 tends to close the throttle 7 in opposition to the force of the spring 93 which tends to open the throttle 7 by means of the linkage 91. Thus, when the engine speed increases, the "brain-suction" in chamber 89 increases which causes the diaphragm 87 to reduce the opening of the throttle 7 until the "brain-suction" and engine speed return to their original values. Conversely, when the engine speed decreases, the "brain-suction" in chamber 89 decreases which allows the spring 93 to move the diaphragm to increase the opening of the throttle 7 until the "brain-suction" and engine speed return to their original values. In this form of my invention, the governed speed may be selected by adjusting the adjusting screw 127 which varies the force of the spring 93. In this form of the invention, it will be noted that the throttle is operated directly by the "brain-pressure." In the foregoing forms of my invention, Figs. 1, 5 and 6, the throttle is operated indirectly by means of a piston-valve which, in turn, is operated by the "brain-pressure." However, this variation does not depart from the scope of my invention in any way. Although the form shown in Fig. 8 appears simpler, it is not preferred to the other forms of this disclosure because it is not so responsive as the other forms in which the speed impulse is amplified by a "power unit" before being transmitted to the displaceable power member 39, Fig. 5, for example.

Figures 9–15 show various forms of the valving means that may be used in this governor without departing from the scope of the invention in any way.

Referring to Figs. 9 and 9a, a slidable member 129 is dish-shaped and operable by any of the movable members previously described. As shown in the cross section, Fig. 9, manifold suction is transferred into the chamber 131 within the member 129 through the conduit 21. The extremities or end walls of the slidable member 129 partially cover the openings from conduits 43a and 45a when the slidable member is in its mid-position as shown in the plan view, Fig. 9a. The conduits 43a and 45a are extensions of the chambers 43 and 45, respectively, shown in Figs. 1 and 5. The other side of the slidable member 129 is exposed to the atmosphere. Hence, air will bleed into the conduits 43ª and 45ª, and into the chamber 131, and out through the conduit 21. Hence, an inlet restriction 133 and an outlet restriction 135 for chamber 45 is formed by the outer wall of the slidable member. Likewise an inlet restriction 137 and an outlet restriction 139 for chamber 43 is formed by the other end of the slidable member. The movement of the slidable member controls the pressures in the chambers 43 and 45 in the same manner as previously described.

Fig. 10 shows a port-type of valving means comprising the four valves 145, 147, 149, 151 operable by the movable member as previously described, and is one of the preferred forms. Atmospheric air enters the extensions of the chambers 45 and 43 through passages 141 and 143, respectively, and flows out through the suction passage 21. The inlet and outlet restrictions to chamber 45 are the valves 145 and 147, respectively. The inlet and outlet restrictions to chamber 43 are the valves 149 and 151, respectively. The operation of this valving means is the same as previously described.

The valving means shown in Fig. 11 is similar to the valving means shown in Fig. 5. In Fig. 5, when the governor is "on-speed," and the valve is in its mid-position, all four of the restrictions 79, 81, 83 and 85 are open about an equal amount so that air continuously circulates through extensions of chambers 43 and 45. The important difference shown in the valving means in Fig. 11 is that the width of the flanges 73ª and 75ª completely covers the openings of the extensions of chambers 45 and 43 when the valve is in its mid-position and the governor is "on-speed." Hence in this construction, there are no inlet and outlet restrictions provided for continuous circulation of fluid through chambers 45 and 43. Accordingly, the throttle operating member will only come to rest when the valves 73ª and 75ª are in closed position. Consider, for example, the effect of the piston-valve shown in Fig. 11, if the air flowing past the governor throttle produced a slight force due to turbulence tending to close the throttle; when the piston-valve shown in Fig. 11 is in its mid-position, the pressure differential across the vane 39 (Fig. 5) is zero. The force on the throttle valve then tends to move the throttle toward a closed position thereby carrying the vane downward and reducing the R. P. M. The reduction in R. P. M. causes the piston-valve shown in Fig. 11 to move to increase the suction across the vane; this action opens the throttle by opening the channel associated with chamber 43 to suction, and opening the channel associated with chamber 45 to atmosphere. The full manifold suction tends to build up in chamber 43 so that the R. P. M. increases until the piston-valve returns to its mid-position and the pressure differential returns to zero, and then the cycle is again repeated. Hence, this form of piston-valve is not so stable as the preferred form characterized by the piston-valve shown in Fig. 5, which is of the same type as the piston-valve mechanisms shown in Figs. 1, 6, 9, 10, 12, 13, 14, 15.

Now consider the effect of the form of piston-valve shown in Fig. 5 if the air flowing past the governor throttle produced a slight force tending to close the throttle; assuming that the piston valve shown in Fig. 5 is in its mid-position, equal amounts of suction exist in both chambers 43 and 45 since all four restrictions are open an equal amount. The force of the air on the throttle valve then tends to move the throttle toward a closed position thereby carrying the vane downward and reducing the R. P. M. The reduction in R. P. M. causes the piston-valve shown in Fig. 5 to move to the right which gradually raises the pressure in the chamber 45 and decreases the pressure in chamber 43; the vane and throttle move upward to restore the governed R. P. M., and the piston-valve assumes a fixed position slightly to the right of mid-position so that a slight pressure differential exists across the vane to balance the force of the air flowing to the engine. The fact that the piston-valve shown in Fig. 5 tends to remain in a fixed position, whereas the piston-valve shown in Fig. 11 must continually move back and forth from mid-position to a position to the right of mid-position explains why the form of piston-valve shown in Fig. 5 is preferred, although any of the forms shown in this disclosure may be employed in my invention.

Fig. 12 shows a carrying forward of the valve means described in connection with Fig. 6. However, an additional flange 153 is provided to control the pressures in two chambers, 43 and 45, formed by the displaceable member as in Figs. 1 and 5 instead of controlling the pressure in only one chamber as in Fig. 6. The operation of the valve shown in Fig. 12 is a multiple of the operation as shown in and described for Fig. 6.

Fig. 13 shows the same type of valve means described in connection with Fig. 9, except that the valve shown in Fig. 13 controls the pressure in only one chamber formed by the displaceable member. The conduit 113 would then be an extension of the chamber 89 in Fig. 6, for example, and the movement of the slidable member 129 would control the pressure in this chamber in the same manner as previously described.

Fig. 14 shows the same valve means described in connection with Fig. 5, except that the valve shown in Fig. 14 controls the pressure in only one chamber formed by the displaceable member. The conduit 113 would then be an extension of the chamber 89 in Fig. 6, for example, and the movement of the movable member would control the pressure in this chamber in the same manner as previously described.

Fig. 15 shows the same valve means described in connection with Fig. 1, except that the valve means shown in Fig. 15 controls the pressure in only one chamber formed by the displaceable member. The conduit 113 would then be an extension of the chamber 89 in Fig. 6, for example, and the movement of the movable member would control the pressure in this chamber in the same manner as previously described.

The "brain-mechanism" of the present invention, as exemplified in this disclosure, may be employed in combination with any other device associated with an internal combustion engine that requires a function of speed or load, or any combination of engine speed or load. Hence, the present invention should be considered in its broader aspect of providing novel means for extracting from the pressure in the intake manifold an exact indication of any desired function of engine speed or engine load, or any combination thereof.

I am aware that the invention may be embodied in other specific forms without departing from the spirit or essential attributes thereof, and I therefore desire the present embodiments to be considered in all respects as illustrative and not restrictive; reference being had to the appended claims rather than to the foregoing description to indicate the scope of the invention.

Having thus fully described my invention, what is claimed and desired to be secured by Letters Patent of the United States is:

1. A governor for controlling the speed of an internal combustion engine, having an intake passage and a throttle valve therein, comprising in combination a conduit for conducting fluid from a region of higher pressure, to a region of lower pressure in the intake passage, two restrictions in the said conduit, one of the said restrictions being variable, the flow of fluid past said variable restriction being always in the same direction under governor operation, and means interconnecting said throttle valve and variable restriction operable to vary the said variable restriction as a function of the throttle movement whereby to maintain predetermined pressure in the said conduit between said restrictions, and a pressure device having a displaceable member for moving the throttle valve, said pressure device communicating with the conduit between the two restrictions, whereby the throttle valve is moved toward the closed position when the engine exceeds a predetermined speed, and the throttle valve moves toward the open position when the engine speed falls below the governed value.

2. A governor for controlling the speed of an internal combustion engine, having an intake passage and a throttle valve therein, comprising in combination a conduit for conducting fluid from a region of higher pressure, to a region of lower pressure in the intake passage, two restrictions in the said conduit, means for varying the opening of at least one of the said restrictions whereby to control the pressure in the said conduit between said restrictions, the value of the said pressure changing as the engine speed is changed, and a motor for actuating said throttle valve, said motor comprising a casing forming a fluid chamber, a member displaceable in said casing sealingly dividing said casing into two chambers, means operable to connect said member and throttle valve for correlated movement therewith, a fluid flow circuit communicating with at least one of said chambers and through which fluid is adapted to be circulated, and two fluid restrictions in the said circuit, the communication of said one chamber with the said circuit being at a point between the last-named two fluid restrictions, means for varying the resistance of at least one of the said restrictions in accordance with changes in the pressure existing in the conduit between the first mentioned two restrictions, the said resistance variation serving to act through said motor to restore the original governed engine speed by effecting a change in the pressure across the said displaceable member.

3. A governor for controlling the speed of an internal combustion engine, having an intake passage and a throttle valve therein, comprising in combination a conduit for conducting fluid from a region of higher pressure, to a region of lower pressure in the intake passage, two restrictions in the said conduit, one of the said restrictions being variable, and means interconnecting said throttle valve and variable restriction operable to vary the said variable restriction as a function of the throttle movement whereby to control the pressure in the said conduit between said restrictions, the value of the said pressure changing as the engine speed is changed, and a motor for actuating said throttle valve, said motor comprising a casing forming a fluid chamber, a member displaceable in said casing sealingly dividing said casing into two chambers, means operable to connect said member and throttle valve for correlated movement therewith, a fluid flow circuit communicating with at least one of said chambers and through which fluid is adapted to be circulated, and two fluid restrictions in the said circuit, the chamber associated with the fluid flow circuit being in communication with the said fluid flow circuit at a point between said last-named two fluid restrictions, valve means for varying the resistance of at least one of the said last-named two restrictions, said valve means being operable by a movable member, resilient means urging said movable member in one direction, and a chamber formed on at least one side of the said movable member, said last-named chamber communicating with the conduit between the first-mentioned two restrictions whereby the pressure differential across the said movable member opposes the force of the said resilient means, the said resistance variation being effected by the movement of the said movable member, the said resistance variation serving to effect operation through said motor to restore the original governed engine speed by effecting a change in the pressure across the said displaceable member.

4. A governor for controlling the speed of an internal combustion engine, having an intake passage and a throttle valve therein comprising in combination a fluid bleed circuit having two parallel inlet conduits and an outlet conduit arranged in series with both of said inlet conduits, restrictions in each of said conduits, one of said inlet conduits being connected to the atmosphere, the other of the said inlet conduits being connected to the said intake passage at a point on the upstream side of the said throttle valve, the outlet conduit being connected to the said intake passage at a point on the downstream side of the said throttle valve, one of said restrictions being variable, means interconnecting said throttle valve and said variable restriction operable to vary the said variable restriction as a function of the throttle movement whereby to maintain substantially constant pressure in the said conduit between the outlet restriction and the two parallel inlet restrictions at any desired variation of engine speed at all throttle positions, and a device to move the throttle valve in accordance with changes in the pressure in the conduit between the two parallel inlet restrictions and the outlet restriction.

5. A control mechanism comprising controlling means, a casing forming a chamber, a member displaceable in said casing responsive to pressure differential and dividing said casing into two chambers, means operable to connect said member and said controlling means for simultaneous movement therewith, means including valving means for regulating said pressure differential, said valving means comprising a shaft having two cylindrical flanges attached perpendicularly thereto and slidable in a cylindrical housing, said flanges sealingly dividing said cylindrical housing into three chambers, a conduit connected to the inner chamber formed between the two flanges, and conduits connected to the two chambers formed on the outer ends of the flange assembly, said last-named conduits being exposed to a source of fluid, the conduit connecting to the inner chamber being exposed on its outer end to a pressure which is different from the pressure on the outer ends of the other two conduits, at least two channels, each of said channels having one end connected to one of the chambers formed by the said displaceable member and the other end connected to the said cylindrical housing, the centerline of the said channels coinciding with the center of the width of the flanges in the center position of the said valving means, the width of the opening of the said channels where the channels join the said cylindrical housing being greater than the thickness of the said flanges, each of the said flanges in cooperation with the said opening of the corresponding channel thereby forming two variable restrictions in each chamber, the restriction located on the high-pressure side of the flange comprising the inlet orifice of the associated chamber, and the restriction on the low pressure side of the said flange comprising the outlet orifice of the associated chamber, the movement of the said valving means increasing the opening of the outlet orifice and decreasing the opening of the inlet orifice in one chamber, and decreasing the opening of the outlet orifice and increasing the opening of the inlet orifice in the other chamber, the pressure in the chamber having the larger inlet passage then being higher than the pressure in the chamber having the smaller inlet passage, thereby effecting movement of the displaceable member in one direction, and opposite movement of said valving means reversing the opening at each orifice whereby the pressure differential across the said displaceable member is reversed and the displaceable member is moved oppositely, and when the said piston is located between its extreme position of travel, all four of the variable orifices are partly open for the circulation of fluid through the associated chambers, the pressure differential across said displaceable member reducing to zero when the four orifices are open substantially the same amount.

6. A governor for an internal combustion engine comprising means having an intake passage and throttling means therein, a fluid motor for actuating said throttling means, said motor comprising a casing forming a fluid chamber, a member displaceable in said casing dividing said casing into two chambers and operable by fluid pressure differential, means operable to connect said displaceable member and throttle valve for correlated movement therewith, a fluid flow circuit communicating with at least one of said chambers and through which fluid is adapted to be circulated, two fluid restrictions in the said circuit, the chamber associated with the fluid flow circuit being in communication with the said fluid flow circuit at a point between said last-named two fluid restrictions, at least one of the said restrictions being variable, the flow of fluid past said variable restriction being always in the same direction under governor operation, said variable restriction being operable by a movable member, resilient means urging said movable member in one direction, the pressure differential across the said movable member opposing the force of the said resilient means, and means operable in accordance with changes in position of said throttling means to control the differential of the forces acting on the said movable member whereby the movement of said variable restriction varies the said pressure differential across said displaceable member to maintain substantially constant engine speed.

7. A control mechanism having controlling means therefor comprising, in combination, a motor for actuating said controlling means, said motor comprising a casing including a fluid chamber, a member displaceable in said casing responsive to pressure differential, said displaceable member comprising one wall of said chamber, means operable to connect said displaceable member and said controlling means for simultaneous movement therewith, a fluid flow circuit communicating with said chamber and through which fluid is adapted to be circulated, two fluid restrictions in said circuit, and means for varying the resistance of both of the said restrictions whereby to produce corresponding pressure variations in the said chamber.

8. A control mechanism having controlling means therefor comprising, in combination, a motor for actuating said controlling means, said motor comprising a casing forming a fluid chamber, a member displaceable in said casing dividing said casing into two chambers, means operable to connect said displaceable member and said controlling means for simultaneous movement therewith, a fluid flow circuit communicating with each of said chambers and through which fluid is adapted to be circulated, at least two fluid restrictions in each of said circuits, and means for varying the resistance of at least one of the said restrictions in one of the said two circuits, said last means varying the resistance of at least two of the said restrictions in the other of the said two circuits, whereby to produce corresponding pressure variations in said two chambers to effect movement of said displaceable member and cooperating controlling means.

9. A control mechanism having controlling means therefor comprising, in combination, a motor for actuating said controlling means, said motor comprising a casing including a fluid chamber, a member displaceable in said casing responsive to pressure differential, said displaceable member comprising one wall of said chamber, means operable to connect said displaceable member and said controlling means for simultaneous movement therewith, a fluid flow circuit communicating with said chamber and through which fluid is adapted to be circulated, only two fluid restrictions in the said circuit, and means separate from and operable independently of said displaceable member to effect a change in opening of both of said only two restrictions whereby to produce corresponding pressure variations in the said chamber.

10. A control mechanism having controlling means therefor comprising, in combination, a motor for actuating said controlling means, said motor comprising a casing forming a fluid chamber, a member displaceable in said casing dividing said casing into two chambers, means operable to connect said displaceable member and controlling means for simultaneous movement therewith, a fluid flow circuit communicating with both of said chambers and through which fluid is adapted to be circulated, at least two fluid restrictions in each of said circuits, and means separate from and operable independently of said displaceable member to effect a change in opening of at least one of the said restrictions in each of the said circuits whereby to produce corresponding pressure variations in said two chambers to effect movement of said displaceable member and cooperating controlling means.

11. An automatic control device for controlling a variable factor, comprising a control member adapted to control said factor, a pressure-responsive member operatively associated with said control member for actuating the same, a circuit having an inlet port and a discharge port and adapted to have fluid flowing therethrough in operation of the device, two restrictions in said circuit, said pressure-responsive member being subjectable on one side thereof to pressure in said circuit between said restrictions therein and on the other side thereof to a pressure other than in said circuit between said two restrictions, biasing means opposing the force acting on said pressure-responsive member as a result of the pressure in said circuit, movable means including valve means controlled by said variable factor to vary simultaneously the restrictive effect of both of said restrictions in response to changes in said variable factor to modulate said pressure throughout the entire range of pressures from the value of pressure at the said inlet port to the value of pressure at the said discharge port in order to effect movement of the pressure-responsive member throughout its entire operative range of movements and as a function of the magnitude of said variable factor.

12. An automatic control device for controlling a variable factor, comprising a control member adapted to control said factor, a pressure-responsive member operatively associated with said control member for actuating the same and adapted to be subjected to pressures on each of the two sides thereof, two circuits adapted to have fluid flowing therethrough in operation of the device, two restrictions in each of said circuits, one side of said pressure-responsive member being subjectable to pressure in one of said two circuits between said two restrictions therein, the second side of said pressure-responsive member being subjectable to pressure in the other of said two circuits between said two restrictions therein, movable means including valve means separate from said pressure-responsive member and controlled by said variable factor to vary simultaneously the restrictive effect of at least one of the said restrictions in each of said two circuits in response to changes in said variable factor in order to subject said pressure responsive member intermittently to modulated differentials of the pressures in said two circuits in order to prevent excessive movement of said pressure-responsive member.

13. An automatic control device for controlling a variable factor, comprising a control member adapted to control said factor, a pressure-responsive member operatively associated with said control member for actuating the same and adapted to be subjected to pressures on each of the two sides thereof, two circuits adapted to have fluid flowing therethrough in operation of the device, each of said circuits having an inlet port and an outlet port, two restrictions in each of said circuits, one side of said pressure-responsive member being subjectable to pressure in one of said two circuits between said two restrictions therein, the second side of said pressure-responsive member being subjectable to pressure in the other of said two circuits between said two restrictions therein, movable means including valve means controlled by said variable factor to vary simultaneously the restrictive effect of both of said restrictions in each of said two circuits in response to changes in said variable factor in order to subject said pressure-responsive member intermittently to modulated differentials of the pressures in said two circuits throughout the entire range of pressures from the value of pressure at an inlet port to the value of pressure at an outlet port and to prevent excessive movement of said pressure-responsive member.

14. In a speed governor for an internal combustion engine having an intake passage for the flow of air therethrough, a throttle in said passage, the combination of a device including means responsive to changes of pressure in said passage at fixed-throttle positions to effect movement of said throttle; and movable means separate from said device and operable in accordance with the movement of said throttle and adapted to produce forces acting on said first-named means, to compensate in a predetermined manner for variations of pressure in said passage resulting from movements of said throttle effected by changes in engine load.

15. In a governor for an internal combustion engine having an intake passage for the flow of air therethrough, said governor comprising a governor throttle operatively mounted within said passage to control the engine, a pressure-responsive member connected to said throttle for actuating the same, a circuit adapted in operation of the engine to have fluid flowing therethrough always in the same direction under governor operation, said pressure-responsive member being subjected to pressure in said fluid circuit, valve means separate from said pressure responsive member and controlled by pressure in said passage and adapted to control said fluid flow in response to changes of intake passage pressure at fixed positions of said throttle and thereby control the pressure in said circuit acting on said pressure responsive member; and means associated with said governor throttle and adapted to control forces acting on said valve means and varying in accordance with positions of said throttle, to compensate for changes of intake passage pressures resulting from movements of the throttle effected by changes in engine load.

16. A governor for an engine comprising means having a movable control member adapted to control a performance factor of said engine; a pressure-responsive member connected to said control member for actuating the same, a circuit adapted in governed operation of the engine to have fluid flowing therethrough, said pressure-responsive member being subjected to pressure in said fluid circuit, movable means including valve means separate from said pressure responsive member controlled by forces varying in response to changes of said performance factor to control said fluid flow and thereby control the pressure in said circuit acting on said pressure responsive member, the flow of fluid past said valve means being always in the same direction under governor operation, and means associated with said control member and adapted to control forces acting on said valve means and varying in accordance with positions of said control member.

17. A governor for an engine comprising means having a movable control member adapted to control engine speed, a pressure-responsive member connected to said control member for actuating the same, a circuit adapted in operation of the engine to have fluid flowing therethrough, two restrictions in said circuit, said pressure-responsive member being subjected to pressure in said fluid circuit between said two restrictions, movable means including valve means separate from said pressure responsive member controlled by forces varying in response to changes of engine speed to vary the restrictive effect of at least one of said two restrictions, the flow of fluid past said variable restriction being always in the same direction under governor operation, and means associated with said control member and adapted to control forces acting on said movable means and varying in accordance with positions of said control member.

18. A governor for an internal combustion engine having an intake passage for the flow of air therethrough, said governor comprising a governor throttle operatively mounted within said passage to control the engine, a pressure-responsive member connected to said throttle for actuating the same, a circuit adapted in operation of the engine to have fluid flowing therethrough, said pressure-responsive member being subjected to pressure in said fluid circuit, valve means adapted to control said fluid flow, the flow of fluid past said valve means being always in the same direction under governor operation, a second pressure-responsive member controlled by pressure in said passage and connected to said valve means for actuating the same and adapted to move in response to changes of intake passage pressure at fixed positions of said throttle; and means connected to said governor throttle and adapted to control forces acting on said valve means and varying in accordance with positions of said throttle, to compensate for changes of intake passage pressures resulting from movements of the throttle effected by changes in engine load.

19. The combination of elements defined in claim 18 in which said second pressure responsive member is responsive to pressure in said intake passage on the downstream side of said throttle.

20. A governor for an internal combustion engine having an intake passage for the flow of air therethrough, said governor comprising a governor throttle operatively mounted within said passage to control the engine speed, a pressure-responsive member connected to said throttle for actuating the same, a circuit adapted in operation of the engine to have fluid flowing therethrough, at least two restrictions in said circuit, said pressure-responsive member being subjected on one side thereof to pressure in said fluid circuit between said two restrictions and on the other side thereof to pressure other than in said circuit between said two restrictions, biasing means opposing the force acting on said pressure-responsive member as a result of the said pressure in said fluid circuit, valve means adapted to vary the restrictive effect of at least one of said two restrictions, the flow of fluid past said valve means being always in the same direction under governor operation, a second pressure-responsive member controlled by pressure in said passage and connected to said valve means for actuating the same and adapted to move in response to changes of intake passage pressure at fixed positions of said throttle; and means connected to said governor throttle and adapted to control forces acting on said valve means and varying in accordance with positions of said throttle, to compensate for changes of intake passage pressures resulting from movements of the throttle effected by changes in engine load.

21. A governor for an internal combustion engine having an intake passage for the flow of air therethrough, said governor comprising a governor throttle operatively mounted within said passage to control the engine, a pressure-responsive member connected to said throttle for actuating the same and adapted to be subjected to pressures on each of the two sides thereof, two circuits adapted to have fluid flowing therethrough in operation of the engine, at least two restrictions in each of said two circuits, one side of said pressure-responsive member being subjectable to pressure in one of said two circuits between said two restrictions therein, the second side of said pressure-responsive member being subjectable to pressure in the other of said two circuits between said two restrictions therein, valve means adapted to vary simultaneously the restrictive effect of at least one of the said restrictions in each of said two circuits, a second pressure-responsive member controlled by pressure in said passage and connected to said valve means for actuating the same and adapted to move in response to changes of intake passage pressure at fixed positions of said throttle; and means connected to said governor throttle and adapted to control forces acting on said valve means and varying in accordance with positions of said throttle, to compensate for changes of intake passage pressures resulting from movements of the throttle effected by changes in engine load.

22. A governor for an internal combustion engine having an intake passage for the flow of air therethrough, said governor comprising a governor throttle operatively mounted within said passage to control the engine, a pressure-responsive member connected to said throttle for actuating the same, a circuit adapted in operation of the engine to have air flowing therethrough and having intake port opening into a region of substantially atmospheric pressure and discharge port opening into the engine manifold at the downstream side of the governor throttle, said pressure-responsive member being subjected to pressure in said circuit, valve means adapted to control the flow of air in said circuit, a second pressure-responsive member controlled by pressure in said passage on the downstream side of said throttle and connected to said valve means for actuating the same and adapted to move in response to changes of intake passage pressure on the downstream side of the throttle at fixed positions thereof; and means connected to said governor throttle and adapted to control forces acting on said valve means and varying in accordance with positions of said throttle, to compensate for changes of intake passage pressures resulting from movements of the throttle effected by changes in engine load.

23. In a speed governor for an internal combustion engine having an intake passage for the flow of air therethrough, the combination of a governor throttle operatively mounted within said passage to control the engine, a pressure-responsive member connected to said throttle for actuating the same, a circuit adapted in operation of the engine to have fluid flowing therethrough, said pressure-responsive member being subjected to pressure in said fluid circuit, valve means adapted to control said fluid flow and thereby control the pressure in said circuit acting on said pressure responsive member, the flow of fluid past said valve means being always in the same direction under governor operation, a second pressure-responsive member controlled by pressure in said passage and connected to said valve means for actuating the same and adapted to move in response to changes of intake passage pressure at fixed positions of said throttle; and movable means adapted to control forces acting on said valve means, to compensate for changes of intake passage pressures resulting from movements of the throttle effected by changes in engine load.

24. A governor for an internal combustion engine having an intake passage for the flow of air therethrough, said governor comprising a governor throttle operatively mounted within said passage to control the engine, a pressure-responsive member connected to said throttle for actuating the same, a circuit adapted in operation of the engine to have fluid flowing therethrough, said pressure-responsive member being subjected to pressure in said fluid circuit, valve means adapted to control said fluid flow, a second pressure-responsive member controlled by pressure in said passage and connected to said valve means for actuating the same and adapted to move in response to changes of intake passage pressure at fixed positions of said throttle, a second fluid circuit communicating with the said intake passage and adapted in operation of the engine to have air flowing therethrough, at least two restrictions in said second circuit, said second pressure-responsive member being subjectable to pressure in said second circuit between said two restrictions therein; and means associated with the said governor throttle to vary the restrictive effect of at least one of said restrictions in said second fluid circuit in accordance with positions of said throttle to control forces acting on said second pressure-responsive member, to compensate for changes of intake passage pressures resulting from movements of the throttle effected by changes in engine load.

25. In an automatic control device for controlling a variable factor, comprising a control member adapted to control said factor, a pressure responsive member operatively associated with said control member for actuating the same, a circuit having an inlet port and a discharge port and adapted to have fluid flowing therethrough in operation of the device, two restrictions in said circuit, said pressure responsive member being subjectable on one side thereof to pressure in said circuit between said restrictions therein and on the other side thereof to pressure other than in said circuit between said two restrictions, movable means including valve means controlled by said variable factor to vary the restrictive effect of at least one of said restrictions in response to changes in said variable factor to modulate said pressure throughout the entire range of pressures from the value of pressure at said inlet port to the value of pressure at the said discharge port for controlling the pressure in said circuit acting on said pressure responsive member, the flow of fluid past said valve means being always in the same direction under governor operation, and means operatively connected to said control member for controlling forces acting on said movable means and varying in accordance with the movement of said control member.

26. The combinations of elements defined in claim 25, wherein said last named means includes a cam movable with said control member and connected to control the forces acting on said movable means.

27. The combination of elements defined in claim 25, wherein said movable means includes second pressure responsive means, and said means connected to said control member includes a second fluid circuit communicating with said second pressure responsive means to provide fluid pressure for actuation thereof, and second valve means in said circuit operatively connected to said control member for regulating said fluid pressure in said second circuit transmitted to said second pressure responsive means.

28. The combination of elements defined in claim 27 in which said second fluid circuit includes two fluid restrictions, and said second pressure responsive means communicates with said second circuit at a point between said two restrictions therein, and said second valve means varies the restrictive effect of at least one of said last named two restrictions for regulating the pressure acting on said second pressure responsive means.

29. The combination of elements defined in claim 27 and variable-force biasing means acting on said pressure responsive member with forces varying as a direct function of the forces produced thereon by fluid pressure in said first fluid circuit, and said valve means controlling pressure on only one side of said pressure responsive member, and second biasing means acting on said movable means whereby the movement of said control member varies as a function of said variable factor.

30. The combination of elements defined in claim 17, and variable-force biasing means separate from said valve means acting on said pressure responsive member with forces varying as a direct function of the forces produced thereon by fluid pressures in said fluid circuit, and said valve means controlling pressures on only one side of said pressure responsive member, and second biasing means acting on said movable means whereby the movement of said control member varies as a function of engine speed to control within a predetermined variation a desired value of engine speed.

31. The combination of elements defined in claim 12, in which said control member maintains within a predetermined variation a desired value of said variable factor, and means operatively connected to said control member for controlling forces acting on said movable means in accordance with the movement of said control member to control said variation of the desired value of said variable factor.

32. The combination of elements defined in claim 12 in which said movable means includes a second pressure responsive means, and a second fluid circuit communicating with said second pressure responsive means to provide fluid pressure for actuation thereof, second valve means in said circuit operatively connected to said control member for regulating said fluid pressure in said second circuit transmitted to said second pressure responsive means.

33. In a governor for automatically controlling the speed of an engine, comprising a control member adapted to control engine speed, a pressure responsive member operatively associated with said control member for actuating the same and adapted to be subjected to pressures on each of the two sides thereof, two circuits adapted to have fluid flowing therethrough in operation of the device, two restrictions in each of said circuits, one side of said pressure responsive member being subjectable to pressure in one of said two circuits between said two restrictions therein, the second side of said pressure responsive member being subjectable to pressure in the other of said two circuits between said two restrictions therein, movable means including valve means separate from said pressure responsive member and controlled by engine speed to vary simultaneously the restrictive effect of at least one of the said restrictions in each of said two circuits in response to changes in engine speed in order to subject said pressure responsive member intermittently to modulated differentials of the pressures in said two circuits in order to prevent excessive movement of said pressure responsive member.

34. The combination of elements defined in claim 25 and variable-force biasing means acting on said pressure responsive member with forces varying as a direct function of the forces produced thereon by fluid pressure in said first fluid circuit, and said valve means controlling pressure on only one side of said pressure responsive member, and second biasing means acting on said movable means whereby the movement of said control member varies as a function of said variable factor.

ROBERT H. THORNER.

References Cited in the file of this patent

UNITED STATES PATENTS

| Number | Name | Date |
|---|---|---|
| 1,944,638 | Engstrom et al. | Jan. 23, 1934 |
| 2,356,679 | Mallory | Aug. 22, 1944 |
| 2,424,836 | Mallory | July 29, 1947 |